UNITED STATES PATENT OFFICE.

HERMAN L. HARTENSTEIN, OF CHICAGO, ILLINOIS, ASSIGNOR, BY MESNE ASSIGNMENTS, TO ELECTRO CHEMICAL & DEVELOPMENT COMPANY, OF PIERRE, SOUTH DAKOTA, A CORPORATION OF SOUTH DAKOTA.

PROCESS IN THE PRODUCTION OF CARBID.

No. 819,221.     Specification of Letters Patent.     Patented May 1, 1906.

Application filed July 23, 1902. Renewed September 30, 1905. Serial No. 280,726.

*To all whom it may concern:*

Be it known that I, HERMAN L. HARTENSTEIN, a citizen of the United States, residing at Chicago, in the county of Cook and State of Illinois, have invented a new and useful Process in the Production of Carbid, of which the following is a specification.

This invention relates to the process in the production of carbid.

It is well known that carbid employed in the manufacture of acetylene gas is exceedingly hygroscopic, possessing great affinity for moisture and readily absorbing the moisture content of the air when exposed thereto. By reason of this hygroscopic quality loss and deterioration is involved in the breaking up, crushing, packing, shipping, storing, and handling of the product.

It is among the objects of my invention to produce carbid in a protected condition and whereby it is protected from contact or exposure to moisture of the air.

In carrying out my invention I apply to the carbid a thin sheet or coating of a protecting substance or material. Many different substances or materials may be employed for this thin protecting sheathing or coating. In practice I have found such materials as coal-tar, glucose, and the like suitable for this purpose, and I prefer to mix therewith a carbonaceous material—such, for instance, as coke reduced to a finely-divided state. The protecting sheathing or coating may be applied to the carbid in any suitable or convenient manner. In practice I have found it convenient to apply the tar, glucose, or the like to the surface of molds, reservoirs, or other receptacles into which the carbid is delivered from the electric or other furnace or elsewhere, and usually in a heated or fluid condition. I have also found it advantageous to apply the tar, glucose, or the like in heated condition to the surfaces of the molds, receptacles, reservoirs, or the like and also to heat the molds previous to the introduction of the melted carbid. The finely-divided carbonaceous material, as coke, may be mixed with the tar, glucose, or the like or sprinkled over the tarred surface of the mold, receptacle, or reservoir. The tar, glucose, or the like sinters or scales over the surface of the hot mold or other receptacle, thereby not only forming a protection for the surface of the mold or receptacle, but also when the molten mass of carbid is delivered therein forming a thin coating or sheathing for the ingot or brick of carbid and which protects the same against absorption of moisture from the air. This sheathing or coating being thin and impervious to water or moisture does not interfere materially with the production of gas in the subsequent commercial use of the carbid, nor does it vary the quality of the illumination produced by the generated gas.

Having now set forth the object and nature of my invention and the manner of carrying the same into practical operation, what I claim as new and useful and of my own invention, and desire to secure by Letters Patent, is—

1. In the production of carbid, the method which consists in applying to the interior surface of a suitable mold a material impervious to water, and then flowing the molten carbid in fluid state directly from the furnace into such mold, whereby the carbid is uniformly coated and impregnated superficially with the said material while fluid and in a state of incandescence, as and for the purpose set forth.

2. In the production of carbid, the method which consists in applying to the interior surface of a suitable mold a preparation of tar, and then flowing the molten carbid in fluid state directly from the furnace into such mold, whereby the carbid is uniformly coated and superficially impregnated with the tar while fluid and in a state of incandescence, as and for the purpose set forth.

3. In the production of carbid, the method which consists in applying to the interior surface of a suitable mold a preparation of tar, then heating such mold and finally flowing the molten carbid in fluid state directly from the furnace into such heated mold, whereby the carbid is uniformly coated and superficially impregnated with the tar while in a state of incandescence, as and for the purpose set forth.

4. In the production of carbid, the method which consists in applying to the interior surface of a suitable mold a combined plastic and pulverulent material impervious to water, and finally flowing the molten carbid in fluid state from the furnace directly into such mold, whereby the carbid is uniformly coated superficially impregnated with the said material while fluid and in a state of incandescence, as and for the purpose set forth.

5. In the production of carbid, the method which consists in applying to the interior surface of a suitable mold a preparation of tar and pulverulent material, and finally flowing the molten carbid in fluid state from the furnace directly into such mold, whereby the carbid is uniformly coated and superficially impregnated with the tar while fluid and in a state of incandescence, as and for the purpose set forth.

6. In the production of carbid, the method which consists in applying to the interior surface of a suitable mold a preparation of tar and carbonaceous material, and then flowing the molten carbid in fluid state from the furnace directly into such mold, whereby the carbid is uniformly coated and superficially impregnated with the tar while fluid and in a state of incandescence, as and for the purpose set forth.

7. The method which consists in coating the interior surfaces of molds with tar mixed with coke in a finely-divided condition, then heating such molds and finally delivering carbid in melted and fluid condition into the heated mold, whereby a protecting coating is applied to the surface of the carbid, as and for the purpose set forth.

In witness whereof I have hereunto set my hand, this 14th day of July, 1902, in the presence of the subscribing witnesses.

HERMAN L. HARTENSTEIN.

Witnesses:
E. C. SEMPLE,
S. E. DARBY.